United States Patent [19]
Hanson et al.

[11] Patent Number: 6,086,086
[45] Date of Patent: Jul. 11, 2000

[54] STROLLER WITH TILT-IN-SPACE CAPABILITY

[75] Inventors: Wayne H. Hanson, Bozeman, Mont.; Wade M. Wolf, Golden, Colo.; William B. Phelps, Bozeman, Mont.

[73] Assignee: Sunrise Medical HHG Inc., Longmont, Colo.

[21] Appl. No.: 09/309,824

[22] Filed: May 11, 1999

[51] Int. Cl.[7] .................................................. B62B 1/00
[52] U.S. Cl. ......................................... 280/650; 280/642
[58] Field of Search ................................ 280/642, 650, 280/643, 647, 648, 47.4, 47.38; 297/377

[56] References Cited

U.S. PATENT DOCUMENTS

| | | | |
|---|---|---|---|
| D. 403,278 | 12/1998 | Lan . | |
| D. 403,621 | 1/1999 | Spinella . | |
| 3,290,050 | 12/1966 | Ezquerra | 280/30 |
| 4,506,906 | 3/1985 | Allden . | |
| 4,655,471 | 4/1987 | Peek . | |
| 4,729,572 | 3/1988 | Bergeron . | |
| 4,966,379 | 10/1990 | Mulholland | 280/242.1 |
| 5,257,799 | 11/1993 | Cone et al. | 280/642 |
| 5,294,141 | 3/1994 | Mentessi et al. | 280/250.1 |
| 5,480,172 | 1/1996 | James | 280/250.1 |
| 5,524,971 | 6/1996 | Jay et al. . | |
| 5,593,173 | 1/1997 | Williamson | 280/642 |
| 5,605,345 | 2/1997 | Erfurth et al. | 280/250.1 |
| 5,636,900 | 6/1997 | Wilkie et al. . | |
| 5,727,809 | 3/1998 | Ordelman et al. | 280/650 |
| 5,865,447 | 2/1999 | Huang | 280/30 |
| 5,947,555 | 9/1999 | Welsh, Jr. | 297/130 |

*Primary Examiner*—Kevin Hurley
*Assistant Examiner*—Kevin McKinley
*Attorney, Agent, or Firm*—MacMillan, Sobanski & Todd, LLC

[57] ABSTRACT

A versatile, adjustable stroller for handicapped children, adolescents and adults. The stroller includes a seat assembly and a frame assembly. The frame assembly includes a tilt-in-space block for allowing the seat assembly to be positioned relative to the frame assembly at a multiplicity of angular positions while providing balanced support for the occupant. The back rest of the seat assembly can be positioned at a multiplicity of angular positions while providing proper anatomical alignment and support for an occupant. The seat assembly can be completely removed from the frame assembly and then installed so that the occupant can face in an opposite direction. The stroller is preferably constructed so as to be collapsible for easy transport and/or storage. The tilt-in-space block enables the structural tubing placement, handle bar placement, and tilt-in-space capability to be situated in one plane, thereby making the stroller narrower to provide the maximum amount of access to the environment for the occupant

32 Claims, 10 Drawing Sheets

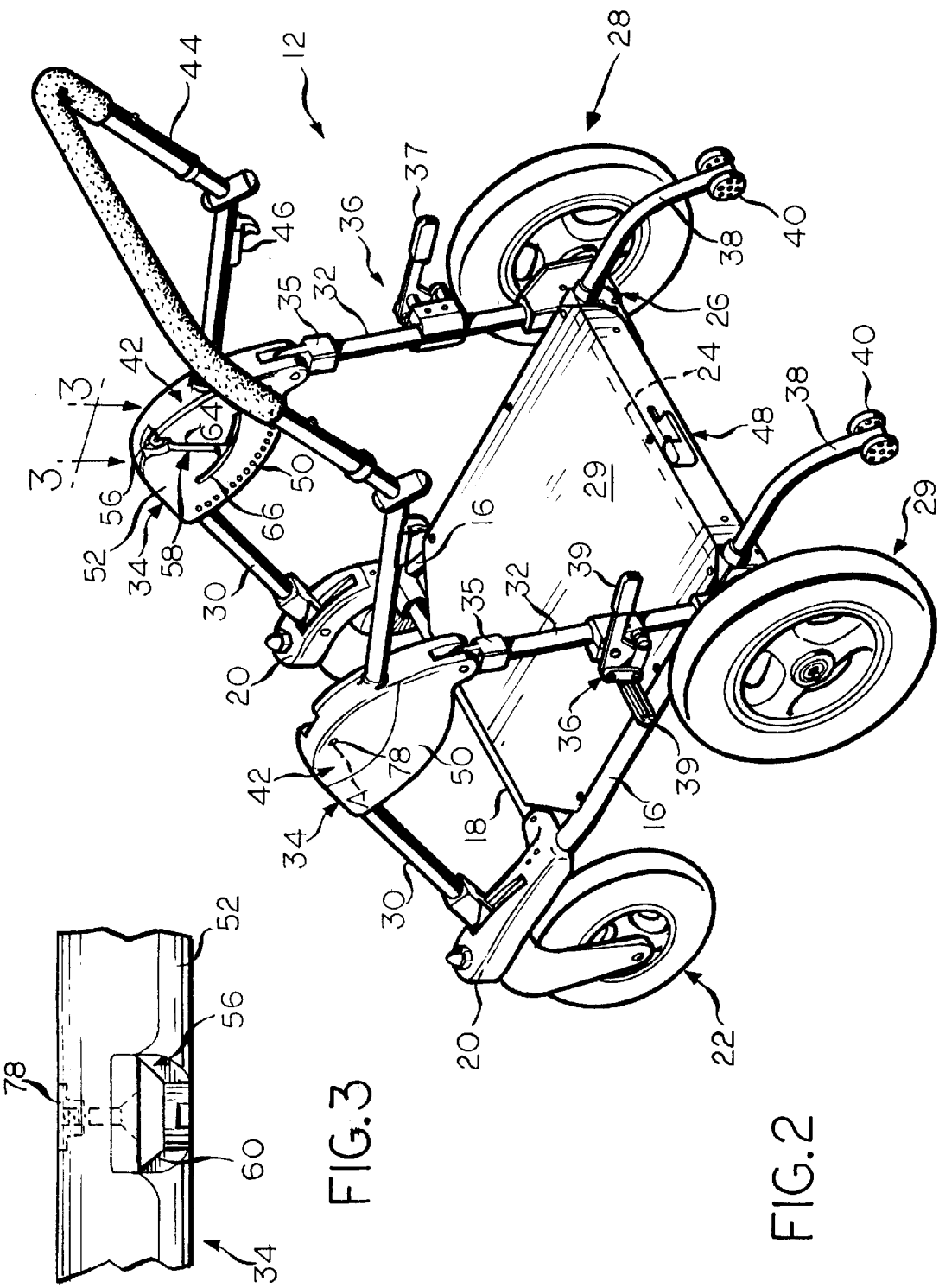

STROLLER WITH TILT-IN-SPACE CAPABILITY

BACKGROUND OF THE INVENTION

This invention relates in general to a stroller, and in particular, to a stroller with a tilt-in-space capability to select the recline angle of the seat assembly of the stroller.

A standard wheelchair is perhaps the most common wheeled support structure for handicapped individuals. Although wheelchairs are commonly designed to be readily adaptable to accommodate individuals of different sizes and shape, they often lack the contoured support needed to properly anatomically align and support the occupant. Further, standard wheelchairs frequently have complicated adjustment mechanisms in order to accommodate individuals of different size and weight, and fail to provide any means for varying the spatial orientation of the occupant without disturbing a therapeutically desired seating posture. Lastly, standard wheelchairs by their design and construction are usually restricted as to the type of terrain which can be traversed. For example, they typically have relatively small swivel wheels or coasters secured to their lower front end for mobility, which, because of their size often act as a limitation on the mobility of the wheelchair.

Another type of wheeled support structure, although not specifically designed for handicapped individuals, is a baby stroller. A wide variety of baby strollers are presently available, but none appear to satisfactorily combine the above desirable characteristics of a wheeled seat support or stroller for a handicapped individual. Baby strollers are designed to function primarily as wheeled structures for babies and small children. Therefore, such strollers are usually engineered to be of a light construction and often include intricate adjustment or collapse mechanisms which would be unduly cumbersome if enlarged to the size necessary for a wheeled support structure or stroller for an adolescent or adult. Lastly, baby strollers generally lack any contoured support such as that needed to properly anatomically align and support a handicapped individual.

Thus, there presently exists a genuine need for a wheeled support structure or stroller capable of properly anatomically aligning and supporting a seated occupant and capable of being adjusted to vary the spatial orientation of the occupant, and yet is easily transportable and storable when not in use.

SUMMARY OF THE INVENTION

This invention relates to a stroller having tilt-in-space capability. The stroller comprises a frame assembly including a tilt-in-space block having at least one cavity, and a seat assembly including at least one latch pin. The at least one latch pin of the seat assembly is capable of being disposed within the at least one cavity of the tilt-in-space block to allow selection of an angular position of the seat assembly with respect to the frame assembly.

In another embodiment of the invention, the stroller comprises a frame assembly including tilt-in-space block and a handle bar block pivotally connected to the tilt-in-space block, and a seat assembly including at least one pivot post capable of being received in the tilt-in-space block. The at least a portion of the handle bar block covers the at least one pivot post when pivoting the handle bar block around the tilt-in-space block, thereby preventing the seat assembly from being removed from the frame assembly when placing the stroller in a folded, down position.

In yet another embodiment of the invention, a stroller having tilt-in-space capability comprises a frame assembly including a tilt-in-space block having a plurality of cavities, and a seat assembly including a tilt-in-space latch pin capable of being received in one of the plurality of cavities of the tilt-in-space block of the frame assembly. A first angular position of the seat assembly with respect to the frame assembly can be selected by positioning the tilt-in-space latch pin within one of the plurality of cavities of the tilt-in-space block, and a second angular position of the seat assembly with respect to the frame assembly can be selected by positioning the tilt-in-space latch pin within a different one of the plurality of cavities of the tilt-in-space block.

In still yet another embodiment of the invention, a stroller comprises a frame assembly including a handle bar block pivotally connected to a tilt-in-space block, and a seat assembly including at least one pivot post pivotally connected to the tilt-in-space block. The combined thickness of the handle bar block and the tilt-in-space block is about one inch.

In another embodiment of the invention, a stroller comprises a frame assembly including tilt-in-space block having a guide slot, and a seat assembly including at least one guide post capable of being received within the guide slot. The least one guide post can prevent the seat assembly from being removed from the frame assembly when the at least one guide post is received within the guide slot.

In a further embodiment of the invention, a stroller having anatomically correct pivot points comprises a frame assembly including tilt-in-space block and a handle bar block pivotally connected to the tilt-in-space block, and a seat assembly including at least one pivot post capable of being received in the tilt-in-space block. The pivot post of the seat assembly is located at approximately a center of mass of an occupant when seated in the stroller.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a rear perspective view of the frame assembly of the invention with the seat assembly removed from the frame assembly;

FIG. 3 is a cross-sectional view of the tilt-in-space block taken along line 3—3 of FIG. 2;

DETAILED DESCRIPTION OF THE PREFERRED EMBODIMENT

Figure 1:
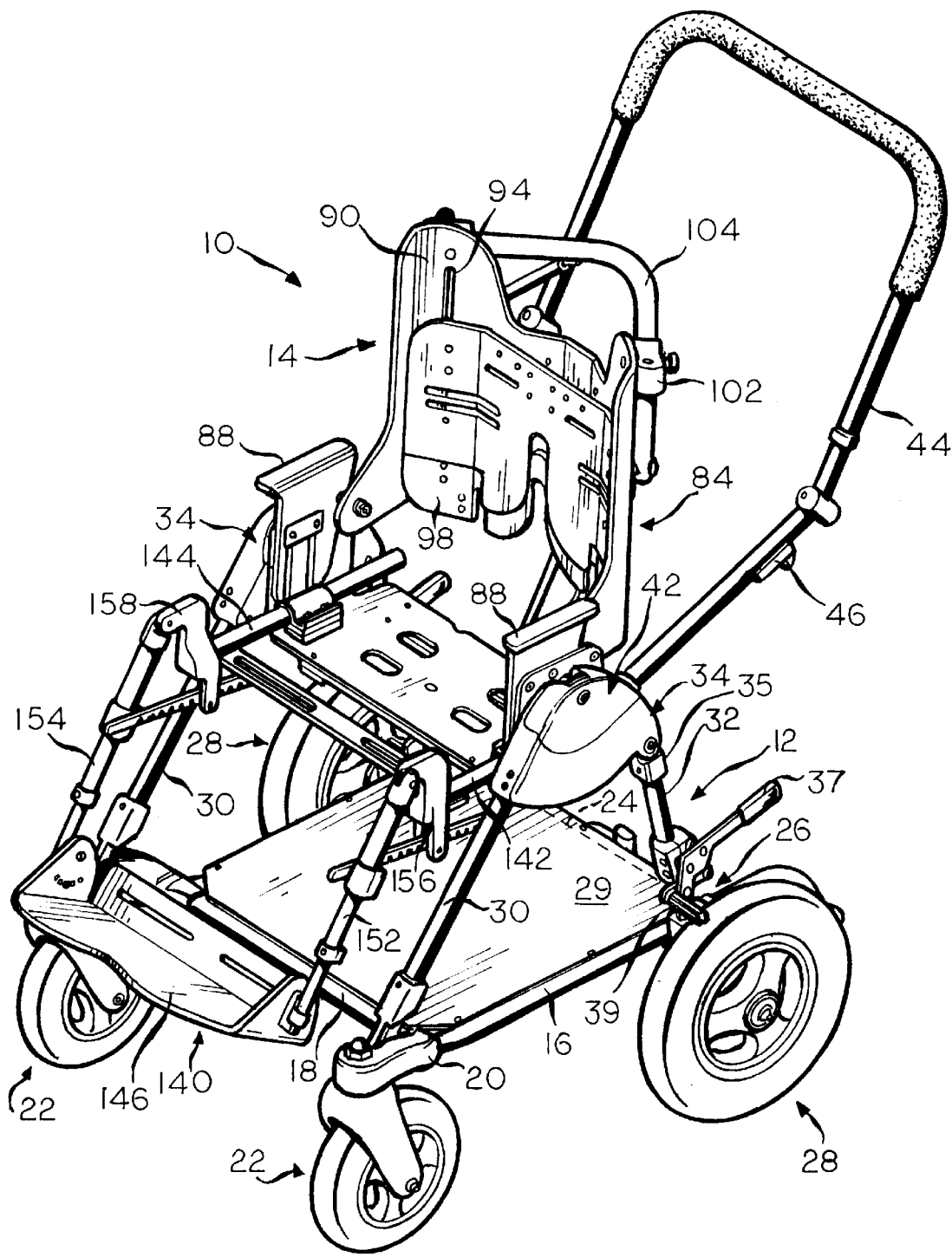
FIG. 1 is a front perspective view of the stroller with tilt-in-space capability in an unfolded, upright position according to a preferred embodiment of the invention.

Referring now to the drawings, there is illustrated in FIG. 1 a stroller, shown generally at 10, according to a preferred embodiment of the invention. The stroller 10 includes a frame assembly, shown generally at 12, and a seat assembly, shown generally at 14. For illustrative clarity, the stroller 10 is shown without seat or back cushions.

Frame Assembly

Referring now to FIGS. 1 through 4, the frame assembly 12 includes a pair of slide tubes 16 connected to a front cross tube 18 by a caster block 20. The caster block 20 is, in turn, connected to a front wheel assembly, shown generally at 22, for movably supporting the frame assembly 12. The pair of slide tubes 16 are also connected to a rear cross tube 24 by a wheel coupling assembly, shown generally at 26. The wheel coupling assembly 26 is, in turn, connected to a rear wheel assembly, shown generally at 28, for movably supporting the frame assembly 12. The frame assembly 12 may also include a platform 29 connected to the slide tubes 16, the front cross tube 18 and the rear cross tube 24 for providing structural reinforcement to the frame assembly 12.

Each side of the frame assembly 12 includes a front diagonal tube 30 and a wheel lock tube 32. The front diagonal tube 30 is pivotally connected to the caster block 20 and fixedly attached to a tilt-in-space (TIS) block 34. The wheel lock tube 32 is pivotally connected to the TIS block 34 by use of a TIS pivot block 35. A wheel lock mechanism, shown generally at 36, may be attached to the wheel lock tube 32 for providing a means for locking the rear wheels. This can be accomplished by moving a lever 37 operatively coupled to a brake 39. Movement of the lever 37 in the upward direction causes the brake 39 to engage the wheel of the rear wheel assembly 28. Similarly, movement of the lever 37 in the downward direction causes the brake 39 to disengage from the wheel of the rear wheel assembly 28. An anti-tip tube 38 may be connected to each slide tube 16 for preventing the stroller 10 from tipping too far in the backward direction. A pair of wheels 40 can be rotatably connected to each side of the anti-tip tube 38 to allow the stroller 10 to freely move when the wheels 40 engage the surface on which the stroller 10 is located.

Figure 4:
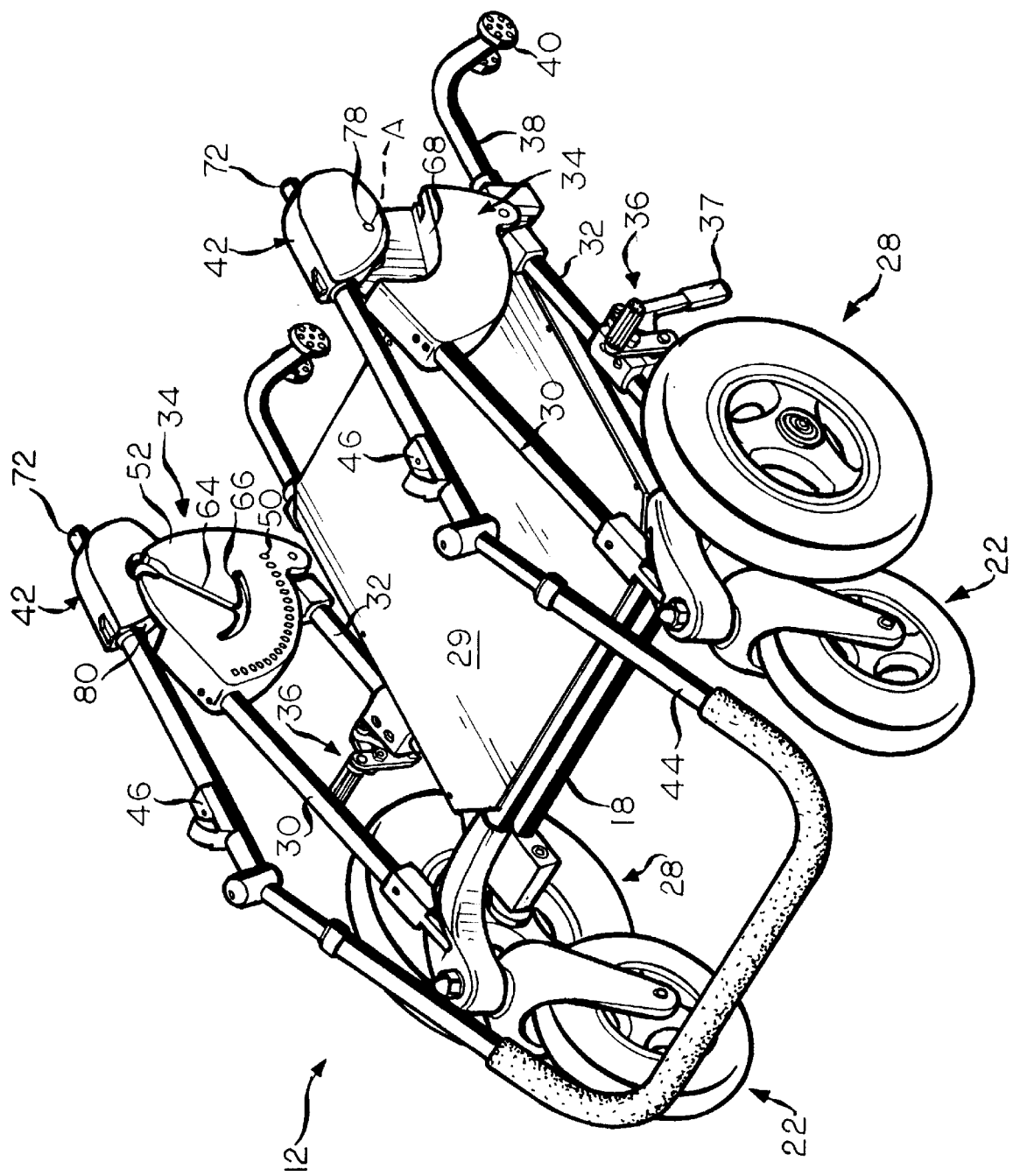
FIG. 4 is a front perspective view of the frame assembly of FIG. 2 in a folded, down position.

The frame assembly 12 also includes a handle bar block, shown generally at 42, for pivotally connecting a handle bar 44 to the frame assembly 12. A spring-loaded release knob 46 may be slidably attached to the handle bar 44 to allow the handle bar 44 to pivot over the TIS block 34 when placing the frame assembly 12 in the folded, down position, as shown in FIG. 4. The release knob 46 will be discussed in further detail below. In addition, the frame assembly 12 includes a latch mechanism, shown generally at 48, for allowing the rear wheel assemblies 28 to move forward when placing the frame assembly 12 in the folded position. The latch mechanism 48 will not be discussed in further detail.

As best seen in FIGS. 2 and 4, the TIS block 34 includes a plurality of apertures or cavities 50, preferably nineteen, arranged in an arc-like pattern on the side walls 52 of the TIS block 34. In the preferred embodiment, the cavities 50 are equally spaced by an arc-length of approximately five degrees with respect to each other. It should be appreciated that the invention is not limited by the number or spacing of the cavities, and that the invention can practiced with any number of cavities and any spacing between the cavities.

Figure 6:
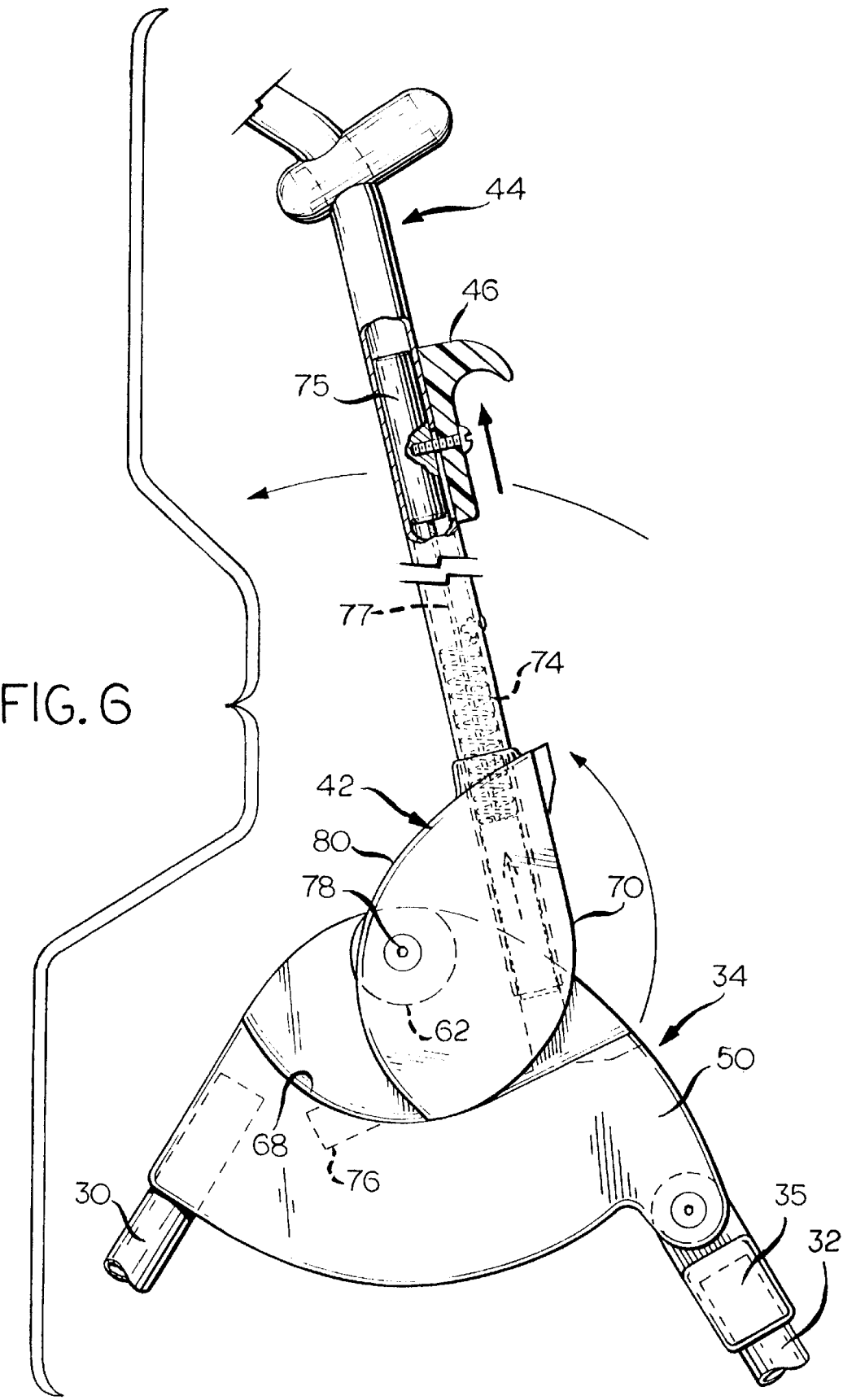
FIG. 6 is a side view of the TIS block when the frame assembly is in a folded, down position.

The TIS block 34 also includes a pivot post slot 56 and a guide slot 58. As best seen in FIG. 3, the pivot post slot 56 includes beveled side walls 60 for receiving a TIS pivot post of the seat assembly 14. The TIS pivot post is not shown in FIG. 3, but is indicated at 62 in FIGS. 7 and 10. Preferably, the guide slot 58 is substantially T-shaped with a generally straight upper portion 64 and an arc-shaped lower portion 66. The purpose of the pivot post slot 56 and the guide slot 58 will be discussed below. As shown in FIG. 6, the TIS block 34 also includes an upper cam surface 68 for mating with the lower cam surface 70 of the handle bar block 42 when the handlebar 44 is in the locked, upright position shown in FIG. 2. In the preferred embodiment, both the TIS block 34 and handle bar block 42 of the stroller 10 have a total thickness of approximately one inch, thereby allowing the maximum amount of access to the environment for the occupant as compared to conventional strollers.

Figure 5:
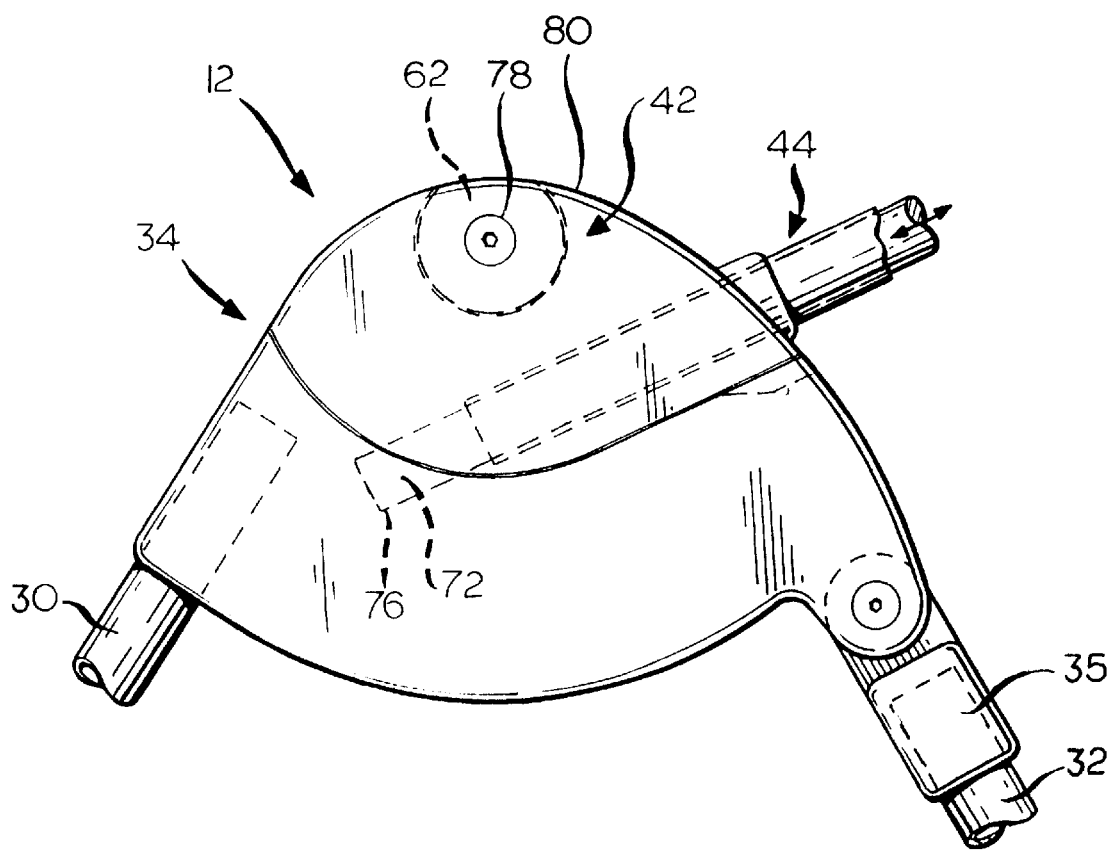
FIG. 5 is a side view of the TIS block when the frame assembly is in an unfolded, upright position.

Referring now to FIGS. 5 and 6, the frame assembly 12 is illustrated in a locked, upright position. The handle bar 44 includes an lower plug 72 slidably disposed within the handle bar 44, as indicated by the directional arrows in FIG. 5. A spring 74 is also disposed within the handle bar 44. An upper plug 75 connected to the release knob 46 is also disposed within the handle bar 44. A cable 77 is connected to the upper plug 75 and the lower plug 72. The spring 74 is positioned between the upper plug 75 and the lower plug 72 so as to exert a downward biasing force against the lower plug 72, thereby positioning the lower plug 72 within a cavity or opening 76 on the upper cam surface 68 of the TIS block 34 when the frame assembly is in the locked, upright position.

Referring now to FIG. 6, to position the frame assembly 12 in an unlocked, folded position, an upward biasing force can be exerted by the release knob 46 having a sufficient amount of force to overcome the downward biasing force exerted by the spring 74 on the lower plug 72, as indicated by the upward directional arrow. As a result, the spring 74 compresses and the lower plug 72 moves upward into the handle bar 44, as indicated by the phantom arrow. After moving a sufficient distance, the lower plug 72 will no longer be disposed within the opening 76 on the upper cam surface 68 of the TIS block 34. At this point, the handle bar 44 can be pivoted around the TIS block 34 about a pivot pin 78 defining a pivot axis, A, as indicated by the arcuate-shaped directional arrows. Once the upward biasing force is removed, the bias of the spring 74 causes the lower plug 72 to extend beyond the lower cam surface 70 of the handle bar block 42.

Seat Assembly

Figure 7:
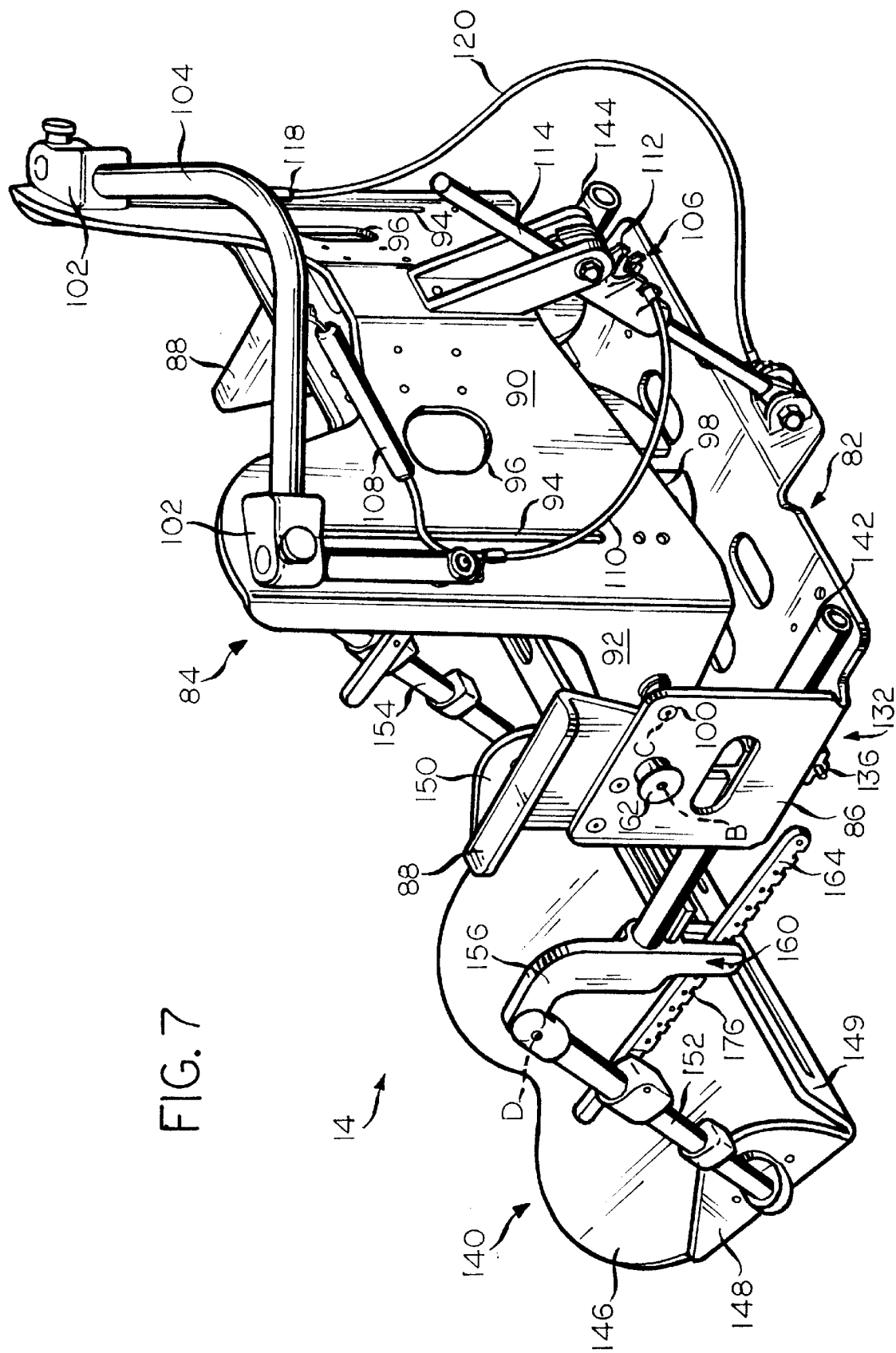
FIG. 7 is a rear perspective view of the seat assembly when in an unfolded, upright position according to the preferred embodiment of the invention.

Referring now to FIG. 7, the seat assembly 14 includes a seat base, shown generally at 82, and a back rest assembly, shown generally at 84. The seat base 82 includes upwardly extending side walls 86, each side wall having the TIS pivot post or arm 62 defining a pivot point, B, for the relative movement of the seat assembly 14 with respect to the frame assembly 12. It should be noted that the pivot point, B, and the pivot point, A, are both located at the anatomically correct position of the center of mass of the occupant. An armrest 88 may be attached to each side wall 86 for the comfort of the occupant.

The back rest assembly 84 includes an outer back rest shell 90 having a pair of lateral pelvic supports 92. The outer back rest shell 90 also includes a pair of outer vertical slots 94 and a pair of inner vertical slots 96. The outer slots 94 allow for the selective adjustment of an inner back rest shell 98 vertically along the outer back rest shell 90 by means of adjustable bolts (not shown) that secure the inner back rest shell 98 to the outer back rest shell 90. The lateral pelvic supports 92 of the outer back rest shell 90 are pivotally secured to the side walls 86 of the seat base 82 using pivot pins 100, which form a pivot point, C, for the back rest assembly 84 to pivot with respect to the seat base 82. In a manner similar to the pivot point, B, the pivot point, C, is positioned at an anatomically correct pivot point of the pelvic area of the occupant. A pair of sunshade blocks 102 may be attached to the outer back rest shell 90. A shell handle 104 can be attached to the pair of sunshade blocks 102 for allowing the user to easily grasp the shell assembly 14.

Figure 8:
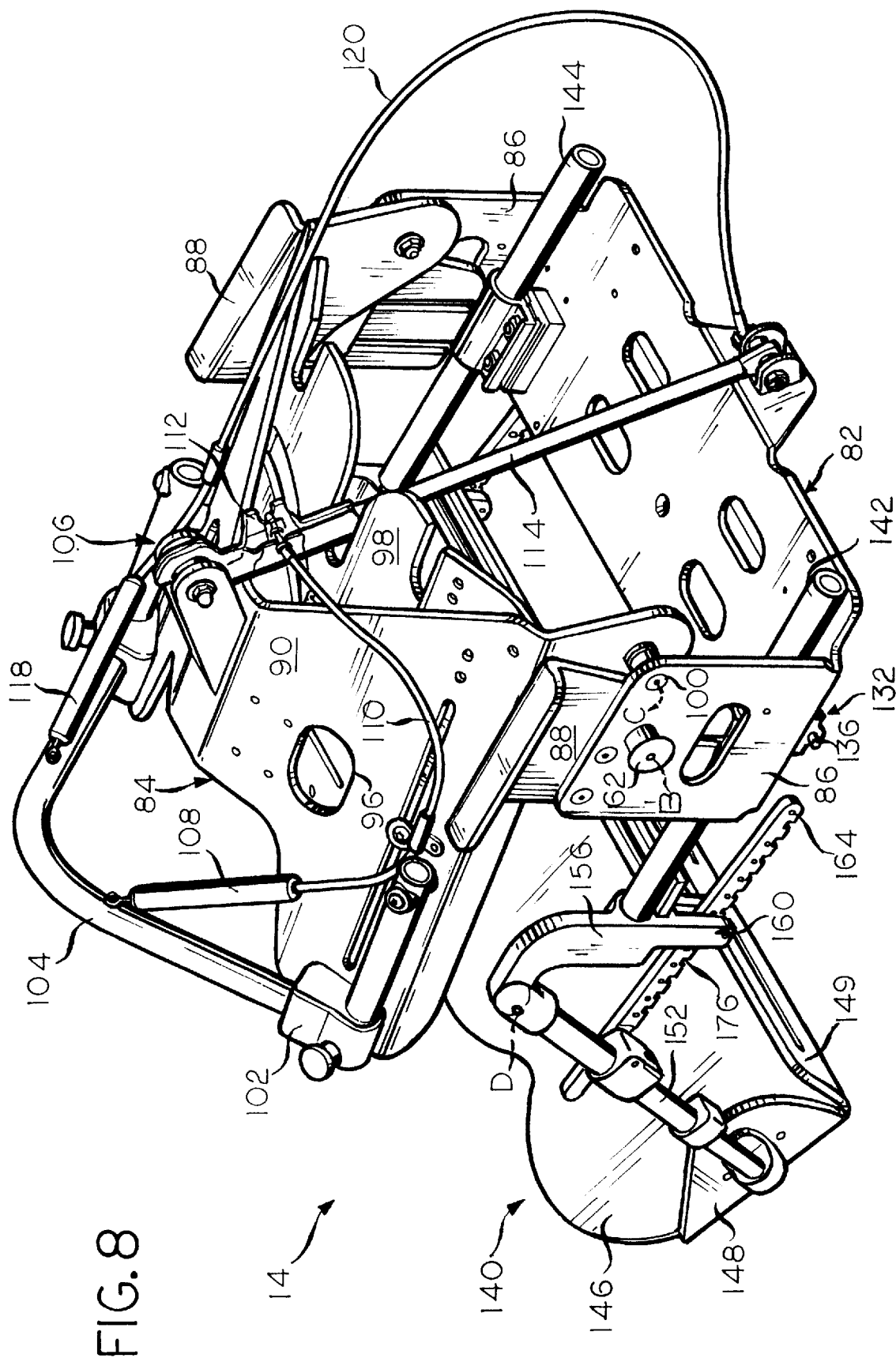
FIG. 8 is a rear perspective view of the seat assembly of FIG. 7 when in the folded, down position.

One feature of the invention is that the seat assembly 14 includes a mechanical locking adjustment mechanism, shown generally at 106, for positioning the back rest assembly 84 at a selected angle relative to the seat base 82. The adjustment mechanism 106 includes a hand-operated release grip 108 operatively coupled to a cable 110. One end of the cable 110 is connected to a coupling 112 that frictionally engages a shaft 114. The adjustment mechanism 106 is biased to a locked position by use of a biasing means, such as a spring (not shown). When an upward or downward force is applied to the release grip 108, the cable 110 causes the coupling 112 to no longer frictionally engage the shaft 114. As a result, the coupling 112 can slide up and down the shaft 114 to infinitely adjust the angle of the back rest assembly 84 with respect to the seat base 82. When the upward or downward force is no longer applied to the release grip 108, the biasing means causes the coupling 112 to frictionally engage the shaft 114 to lock the selected angle of the back rest assembly 84 in place. The adjustment mechanism 106 allows the seat assembly 14 to be placed in a folded position by moving the back rest assembly 84 to a fully forward angular position relative to the seat base 82, as shown in FIG. 8.

Figure 9:
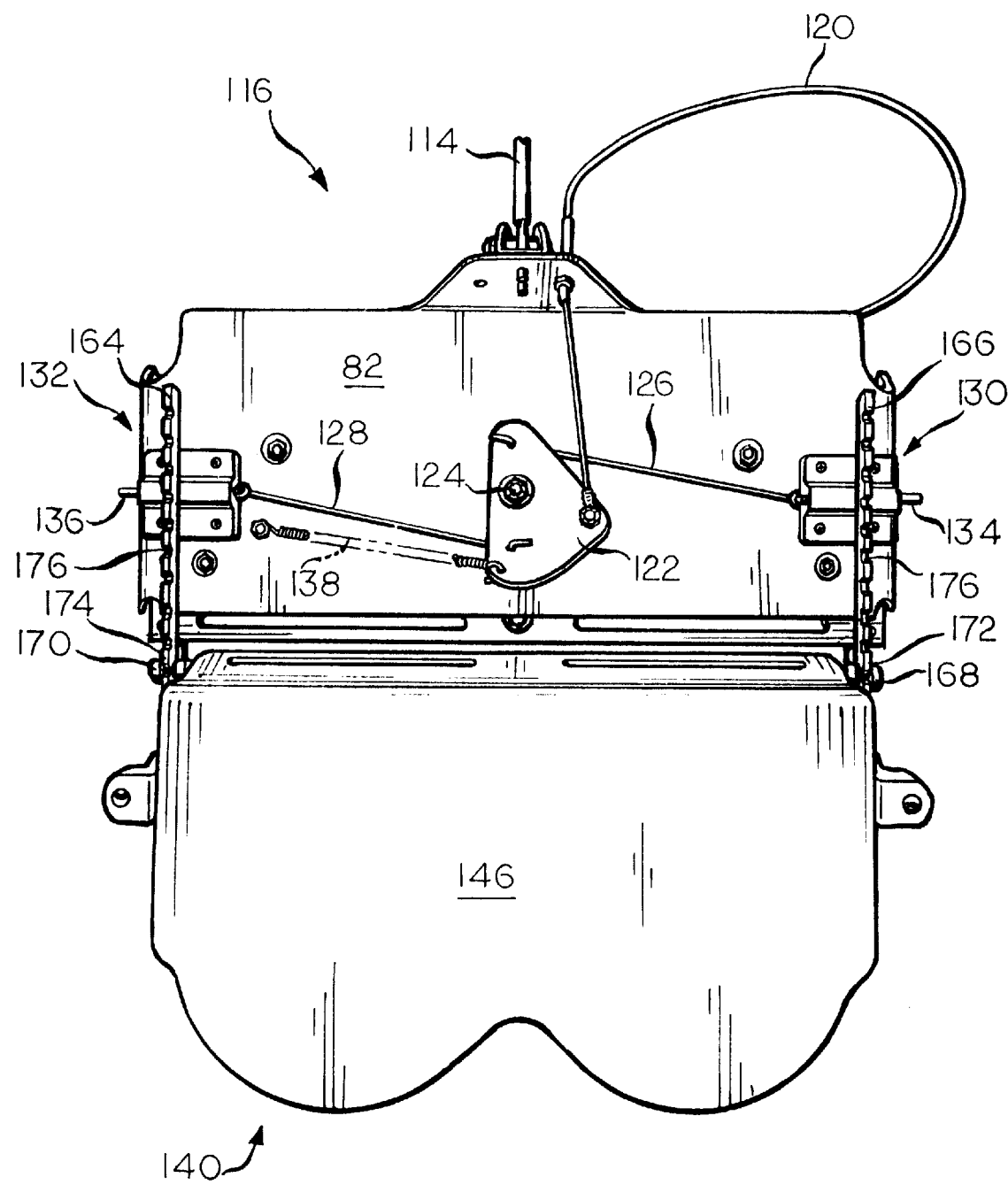
FIG. 9 is a bottom cutaway view of the seat assembly showing the TIS latch mechanism.

Another feature of the invention is that the seat assembly 14 also includes a latch mechanism, shown generally at 116, for positioning the seat assembly 14 relative to the frame assembly 12 in a multiplicity of selected locations. As best seen in FIG. 9, the latch mechanism 116 includes a hand-operated release grip 118 operatively coupled to a cable 120. One end of the cable 120 is operatively coupled to an apex of a triangular-shaped TIS activator plate 122. The TIS activator plate 122 is pivotally mounted to the underside of the seat base 82 by a pivot pin 124. A pair of TIS linkage rods 126, 128 are operatively connected to the other apexes of the triangular-shaped TIS activator plate 122. The other end of each TIS linkage rod 126, 128 is operatively coupled to one end of a latch pin mechanism 130, 132, respectively. The other end of each latch pin mechanism includes a TIS latch pin 134, 136.

The latch pin mechanisms 130, 132 are positioned at the underside of the seat base 82 such that the TIS latch pins 134, 136 protrude from the seat base 82 when the lock pin mechanisms 130, 132 are in the locked position. The latch pin mechanisms 130, 132 are biased to a locked position by use of a biasing means, such as a spring 138. The length of the TIS latch pins 134, 136 are such that they can be inserted into the cavities 50 on the TIS block 34. In this manner, the angular position the seat assembly 14 relative to the frame assembly 12 can be selected by applying an upward or downward force on the release grip 118 which causes the TIS activator plate 122 to pivot in a counterclockwise direction (as viewed in FIG. 9). This counterclockwise pivoting movement of the TIS activator plate 122 causes the TIS linkage rods 126, 128 to move inwardly toward the center of the seat base 82, which in turn, causes the TIS latch pins 134, 136 to also move laterally toward the center of the seat base 82 and retract into their respective latch pin mechanisms 130, 132.

When the TIS latch pins 134, 136 retract such that they no longer are inserted into the cavities 50 of the TIS block 34, the seat assembly 14 is in an unlocked position. When in the unlocked position, the seat assembly 14 can pivot about pivot posts 62, i.e. about pivot point, B, such that the orientation or the angular position of the seat assembly 14 relative to the frame assembly 12 can be moved to the desired angular position. Once the angular position is selected by the stroller attendant, the upward or downward force applied to the release grip 118 can be released such that the bias of the spring 138 causes the TIS activator plate 122 to pivot in a clockwise direction (as viewed in FIG. 9). This pivoting movement causes the TIS linkage rods 126, 128 to move outwardly from the center of the seat base 82 until the TIS latch pins 134, 136 protrude from their respective latch pin mechanisms 130, 132 and become disposed within the cavities 50 of the TIS block 34, thereby locking the seat assembly 14 at the selected angular position. In this manner, the stroller 10 has a tilt-in-space (TIS) capability enabling the stroller attendant to select the desired angular position of the seat assembly 14 with respect to the frame assembly.

Referring now to FIGS. 1, 7, 8 and 9, the seat assembly 14 also includes a foot rest assembly, shown generally at 140, attached to the seat base 82 by a pair of foot rest tubes 142, 144. The foot rest assembly 140 includes a foot bed 146 having side walls 148, 150 mounted to a pair of foot bed tubes 152, 154. The foot bed 146 may also include a back wall 149 that functions as a heel stop for the occupant. Each foot bed tube 152, 154 is, in turn, pivotally mounted to a knee angle block 156, 158. The knee angle blocks 156, 158 are, in turn, attached to the seat base 82 by the foot rest tubes 142, 144. Each knee angle block 156, 158 has a forked lower portion 160, 162 for receiving a knee angle adjustment bar 164, 166 therebetween. A biasing means, such as return springs 168, 170, are positioned between the knee angle adjustment bars 164, 166 and the knee angle blocks 156, 158 to cause a downward biasing force on the knee angle adjustment bars 164, 166. A knee angle adjustment pin 172, 174 are secured to the lower portions 160, 162 to span across the forked lower portions 160, 162. A plurality of grooves 176 are located on the bottom of each knee angle adjustment bar 164 and are dimensioned such that the knee angle adjustment pins 172, 174 can be seated within the grooves 176 to prevent movement of the knee angle adjustment bars 164, 166. It should be appreciated that the invention is not limited by the number of grooves 176 in the knee angle adjustment bars 164, 166, and that the invention can be practiced with any number of grooves.

By applying a sufficient amount of upward force on the knee angle adjustment bars 164, 166 to overcome the downward force exerted by the return springs 168, 170, the knee angle adjustment pins 172, 174 will no longer be seated in the grooves 176 of the knee angle adjustment bars 164, 166. As a result, the knee angle adjustment bars 164, 166 can move relative to the knee angle blocks 156, 158. This relative movement causes pivotal movement of the foot bed 146 until the foot bed 146 is positioned at a selected angular position. When the upward force is no longer applied to the knee angle adjustment bars 164, 166, the downward biasing force of the springs 168, 170 cause the knee angle adjustment bars 164, 166 to engage the knee angle adjustment pins 172, 174. When the grooves of the knee angle adjustment bars 164, 166 are properly aligned with the knee angle adjustment pins 172, 174, the knee angle adjustment pins 172, 174 will seat in the grooves 176 to prevent further movement of the knee angle adjustment bars 164, 166. In this manner, the foot rest assembly 140 allows for positioning of the foot bed 146 in a multiplicity of selected angular positions.

It should be appreciated that the foot bed tubes 152, 154, as well as, the foot bed 146, pivot about a pivot axis, D, with respect to the knee angle blocks 156, 158 of the foot bed assembly 140. The pivot axis, D, is positioned to be at an anatomically correct knee position for the occupant to provide the amount of maximum comfort for the occupant.

One advantage of the invention is that the seat assembly 14 can be completely removed from the frame assembly 12 by applying an upward or downward force to the release grip 118 such that the TIS latch pins 134, 136 no longer are seated within the cavities 50 of the TIS block 34. By lifting up on the seat assembly 14 by preferably as using the shell handle, the seat assembly 14 can be lifted upward until the pivot posts 62 are no longer seated in the pivot post slot 56. At this point, the seat assembly 14 can be completely removed from the frame assembly 12. After being completely removed from the frame assembly 12, the seat assembly 14 can then be positioned in the frame assembly 12 such that the seat assembly 14 is facing in an opposite direction in which the seat assembly 14 was facing before it was removed. In this manner, the occupant can face in an opposite direction in the stroller 10.

Figure 10:
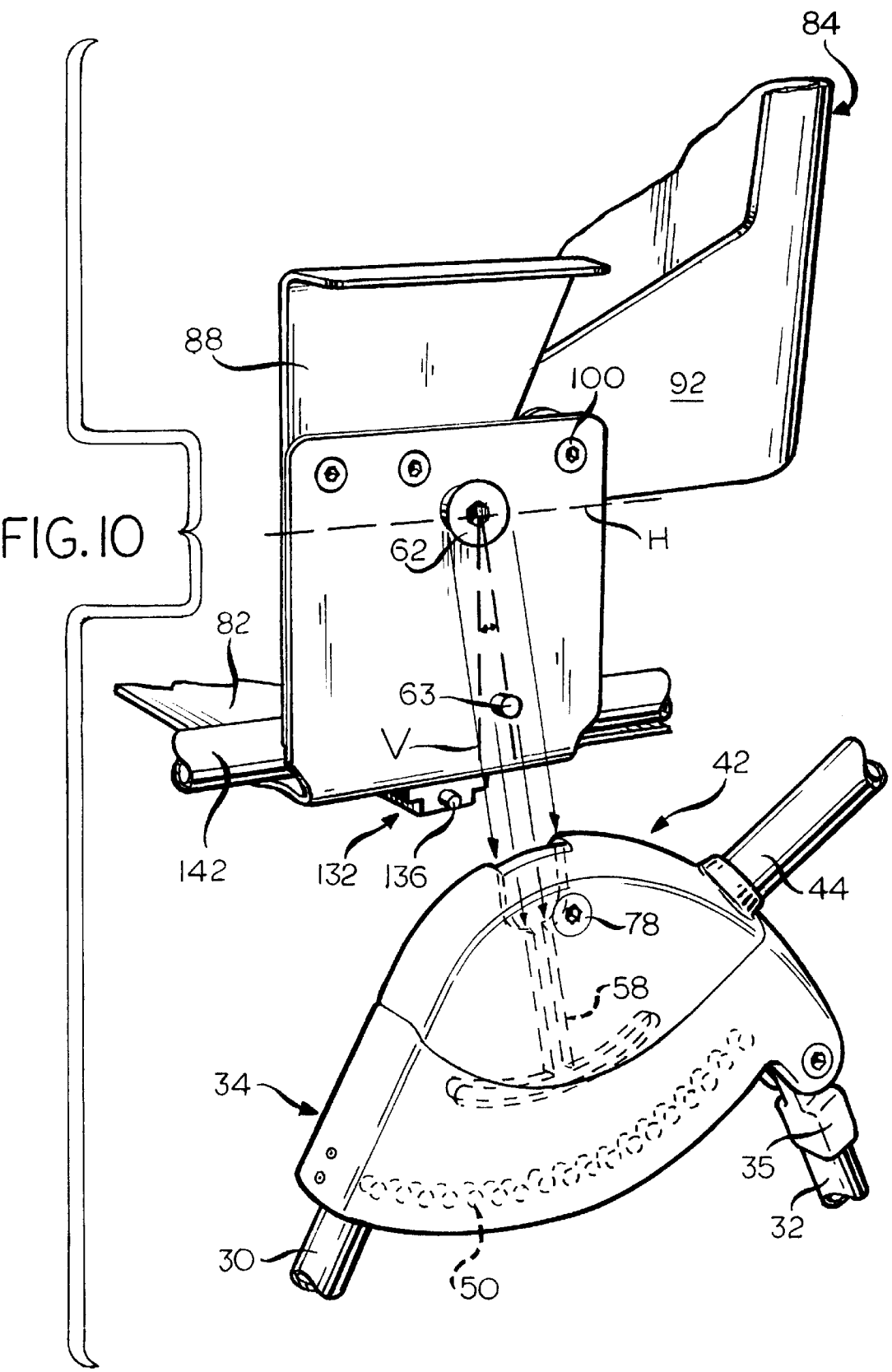
FIG. 10 is a side cutaway view of the seat assembly and the frame assembly showing the TIS pivot post of the seat assembly being inserted into the TIS block of the frame assembly.
Figure 11:
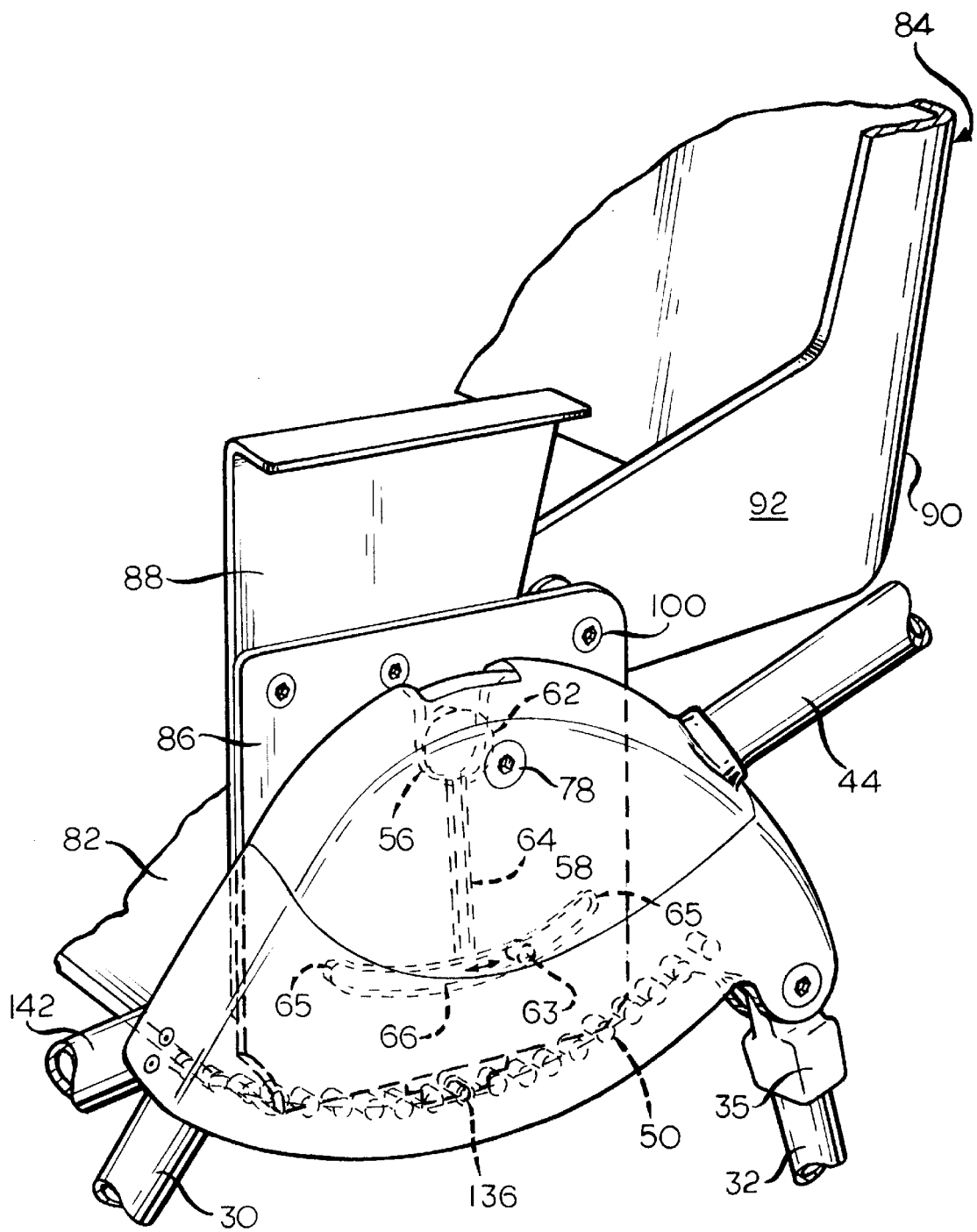
FIG. 11 is a side cutaway view of the seat assembly and the frame assembly of FIG. 10 showing the TIS pivot post of the seat assembly inserted into the TIS block of the frame assembly.

To install the seat assembly 14 after being completely removed from the frame assembly 12, the TIS pivot post 62 and a guide pin 63 on each side of the seat assembly 14 are aligned with the pivot post slot 56 and the guide slot 58, as shown in FIG. 10. Then, the TIS pivot post 62 and a guide pin 63 of the seat assembly 14 are inserted into the pivot post slot 56 and the guide slot 58 of the frame assembly 12, as indicated by the arrows in FIG. 10, until the guide pin 63 enters the guide slot 58 and the TIS pivot post 62 is seated in the pivot post slot 56, as shown in FIG. 11. While installing the seat assembly 14 to the frame assembly 12, the TIS latch pins 134, 136 are preferably retracted within their respective latch pin mechanisms 130, 132. However, retraction of the TIS latch pins 134, 136 is not necessary during the installation as the side walls 52 of the TIS block 34 can be used to depress the TIS latch pins 134, 136 into their respective latch pin mechanisms 130, 132.

In the preferred embodiment, the guide pin 63 is offset from the TIS pivot post 62 by an angle, θ, of about twenty degrees with respect to the vertical axis, V, of the seat assembly 14. As mentioned earlier, the TIS block 34 preferably includes nineteen equally-spaced cavities 50 with an arc-length of approximately five degrees with respect to each other to provide eighteen indexing positions for the stroller 10. The full range of motion of the seat assembly 14 with respect to the frame assembly 12 is eighteen positions times five degrees, or about ninety degrees. However, because the guide pin 63 is offset from the TIS pivot post 62 by an angle, θ, of about twenty degrees, the maximum angular position of the seat assembly 14 with respect to the frame assembly 12 can be approximately twenty-five degrees in the forward direction and approximately sixty-five degrees in the rearward direction, with respect to the horizontal axis, H. Thus, the offset angle, θ, of the guide pin 63 enables the seat assembly 14 to tilt a greater amount in the rearward direction than in the forward direction.

Once the seat assembly 14 is installed onto the frame assembly 12, the angular position of the seat assembly 14 with respect to the frame assembly 12 can be selected by retracting the TIS latch pins 134, 136 into their respective latch pin mechanisms 130, 132. At this point, the seat assembly 14 can be pivoted about the pivot axis, B, as defined by the TIS pivot posts 62, until the seat assembly 14 is at the desired angular position.

It should be noted that once the seat assembly 14 is installed, the seat assembly 14 becomes an integral part of the frame assembly 12, thereby allowing the seat assembly 14 to accommodate significant loads. It should also be noted that while the seat assembly 14 is pivoting about the pivot axis, B, the guide pin 63 moves along the lower portion 66 of the guide slot 58 of the TIS block 34, as shown in FIG. 11. In the event that the seat assembly 14 has been pivoted an excessive amount, the guide pin 63 will abut against the ends 65 of the lower portion 66, thereby acting as a stop to prevent excessive pivotal movement of the seat assembly 14.

As described above, the stroller 10 having tilt-in-space capability provides several advantageous features in comparison with conventional strollers. One feature is that the TIS block 34 includes a plurality of cavities 50 capable of having the latch pins 134, 136 disposed therein. This feature enables the seat assembly 14 to be positioned in a wide range of indexable angular positions with respect to the frame assembly 12.

The invention also provides the feature that the seat assembly 14 pivots with respect to the frame assembly 12 about a pivot axis, B, located at approximately the center of mass of the occupant when seated in the stroller 10. In the preferred embodiment, the pivot post 62 is positioned approximately 3 to 6 inches forward of the outer back rest shell 90 and approximately 4 to 8 inches above the seat base 82 so that the center of mass of the occupant will coincide with the pivot axis. B, thereby providing stability of the stroller 10. In addition, the back rest assembly 84 and the foot rest assembly 140 pivot about a pivot axes, C and D, located at approximately anatomically correct positions with respect to the occupant's pelvic and knee areas, respectively.

Another feature of the invention is that the seat assembly 14 can be completely removed from the frame assembly 12. This feature allows the seat assembly 14 to be positioned in an opposite direction, if desired. It should be noted that the stroller 10 has similar TIS capabilities and stability characteristics, regardless of the direction in which the seat assembly 14 is facing.

The invention also provides several important safety features in comparison with conventional strollers. One feature is prevention of the inadvertent removal of the seat assembly 14 from the frame assembly 12 during certain operating conditions. This is accomplished by the handle bar block 42 covering the pivot post 62 when the handle bar 44 is pivoted from the locked, upright position to the unlocked, down position. In addition, the latch pins 134, 136 are seated in the cavities 50 and need to be retracted into their respective latch pin mechanisms 130, 132 before the seat assembly 14 can be removed from the frame assembly 12. Further, the guide pin 63 needs to be in same vertical angular alignment with the straight upper portion 64 of the guide slot 58 before the seat assembly 14 can be removed from the frame assembly 12, even though the TIS latch pins 134, 136 are retracted into their respective latch pin mechanisms 130, 132. This prevents inadvertent removal of the seat assembly 14 during adjustment of the angular position of the seat assembly 14 with respect to the frame assembly 12. It should be also noted that the offset angle, θ, of the guide pin 63 enables the seat assembly 14 to tilt a greater amount in the rearward direction than in the forward direction, thereby decreasing the likelihood that the occupant will fall forward out of the stroller 10.

The invention also provides the feature of providing a maximum amount of access to the environment for the occupant. This can be accomplished because the placement of the slide tubes 16, the front diagonal tubes 30, the wheel lock tubes 32, and the handle bar 44 are all situated within the generally planar space defined by the combined thickness of the TIS block 34 and the handle bar block 42 which have a thickness no greater than about one inch.

Still yet another feature of the invention is that the stroller 10 can be easily placed in the folded position for storage. This can be accomplished by moving the back rest assembly 84 and the rear wheel assemblies 28 to the forward position, thereby placing the stroller 10 is a more compact configuration when compared to conventional strollers.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A stroller having tilt-in-space capability, comprising:
   a frame assembly including a tilt-in-space block having at least one cavity, and
   a seat assembly including a seat base, a back rest assembly, and at least one latch pin,
   wherein the at least one latch pin of the seat assembly is capable of being disposed within the at least one cavity of the tilt-in-space block to allow selection of an angular position of the seat assembly with respect to the frame assembly, and
   wherein the tilt-in-space block of the frame assembly further includes a pivot post slot, and wherein the seat assembly further includes a pivot post capable of being received in the pivot post slot for pivotally mounting the seat assembly to the frame assembly.

2. The stroller according to claim 1, wherein the tilt-in-space block has a plurality of cavities to allow selection of a plurality of angular positions of the seat assembly with respect to the frame assembly.

3. The stroller according to claim 1, wherein the tilt-in-space block includes a guide slot, and wherein the seat assembly includes a guide pin, the guide pin capable of being disposed within the guide slot for preventing the angular position of the seat assembly with respect to the frame assembly from exceeding a maximum angular position.

4. The stroller according to claim 1, further comprising a foot rest assembly including a foot rest tube connected to the seat assembly, a knee angle block connected to the foot rest tube portion, a foot bed tube pivotally connected to the knee angle block, and a foot bed connected to the foot bed tube.

5. The stroller according to claim 1, wherein the seat assembly includes a seat base and a back rest pivotally mounted to the seat base.

6. The stroller according to claim 1, wherein the frame assembly further includes a handle bar block including a lower cam surface being capable of mating with the upper cam surface of the tilt-in-space block.

7. The stroller according to claim 2, wherein the plurality of angular positions are in increments of approximately five degrees with respect to each other.

8. The stroller according to claim 4, further including a knee angle adjustment bar operatively coupled to the knee angle block for adjusting an angle of the foot bed with respect to the seat assembly.

9. The stroller according to claim 5, further including an adjustment mechanism for adjusting an angle between the back rest and the seat base.

10. A stroller, comprising:
    a frame assembly including a tilt-in-space block and a handle bar block pivotally connected to the tilt-in-space block; and
    a seat assembly including at least one pivot post capable of being received in the tilt-in-space block,
    wherein at least a portion of the handle bar block covers the at least one pivot post when pivoting the handle bar block around the tilt-in-space block, thereby preventing the seat assembly from being removed from the frame assembly when placing the stroller in a folded, down position.

11. The stroller according to claim 10, wherein the tilt-in-space block includes at least one cavity, and wherein the seat assembly includes at least one tilt-in-space latch pin capable of being received in the at least one cavity of the tilt-in-space block to allow selection of an angular position of the seat assembly with respect to the frame assembly.

12. The stroller according to claim 10, wherein the tilt-in-space block includes a plurality of cavities for allowing the seat assembly to be positioned at a plurality of angular positions with respect to the frame assembly.

13. The stroller according to claim 10, wherein the tilt-in-space block includes a guide slot, and wherein the seat assembly includes a guide pin, the guide pin capable of being disposed within the guide slot for preventing an angle of the seat assembly with respect to the frame assembly from exceeding a maximum angle.

14. The stroller according to claim 10, further comprising a foot rest assembly including a foot rest tube connected to the seat assembly, a knee angle block connected to the foot rest tube portion, a foot bed tube pivotally connected to the knee angle block, and a foot bed connected to the foot bed tube.

15. The stroller according to claim 10, wherein the seat assembly includes a seat base, a back rest pivotally connected to the seat base, and an adjustment mechanism for adjusting an angular position of the back rest with respect to the seat base.

16. The stroller according to claim 10, wherein the seat assembly is capable of being pivotally mounted to the frame assembly in at least two directions with respect to the frame assembly.

17. The stroller according to claim 10, wherein the frame assembly includes a handle bar, and wherein the tilt-in-space block includes an opening for receiving the handle bar.

18. The stroller according to claim 14, further including a knee angle adjustment bar operatively coupled to the knee angle block for adjusting an angle of the foot bed with respect to the seat assembly.

19. A stroller having tilt-in-space capability, comprising:
    a frame assembly including a tilt-in-space block having a plurality of cavities; and
    a seat assembly including a seat base, a back rest assembly and a tilt-in-space latch pin capable of being received in one of the plurality of cavities of the tilt-in-space block of the frame assembly,
    wherein a first angular position of the seat assembly with respect to the frame assembly can be selected by positioning the tilt-in-space latch pin within one of the plurality of cavities of the tilt-in-space block, and wherein a second angular position of the seat assembly with respect to the frame assembly can be selected by positioning the tilt-in-space latch pin within a different one of the plurality of cavities of the tilt-in-space block, and wherein the tilt-in-space block further includes a pivot post slot and a guide slot, and wherein the seat assembly includes at lest one pivot post capable of being received in the pivot post slot and a guide pin capable of being received in the guide slot.

20. The stroller according to claim 19, wherein the first angular position is separated from the second angular position by an arc-length of approximately five degrees.

21. The stroller according to claim 19, further comprising a foot rest assembly including a foot rest tube connected to the seat assembly, a knee angle block connected to the foot rest tube portion, a foot bed tube pivotally connected to the knee angle block, and a foot bed connected to the foot bed tube.

22. The stroller according to claim 19, wherein the seat assembly includes a seat base and a back rest pivotally mounted to the seat base.

23. The stroller according to claim 21, further including a knee angle adjustment bar operatively coupled to the knee angle block for adjusting an angle of the foot bed with respect to the seat assembly.

24. The stroller according to claim 22, further including an adjustment mechanism for adjusting an angle between the back rest and the seat base.

25. The stroller according to claim 20, wherein the frame assembly includes a handle bar block pivotally connected to the tilt-in-space block, and wherein a combined thickness of the handle bar block and the tilt-in-space block is about one inch.

26. A stroller, comprising:

a frame assembly including a tilt-in-space block having a pivot post slot and a guide slot; and a seat assembly including at least one pivot post capable of being received in the pivot post slot and at least one guide pin capable of being received within the guide slot, wherein said seat assembly can be removably attached to said frame assembly when the at least one pivot post is received within the pivot post slot and the at least one guide pin is received within the guide slot, and wherein the seat assembly includes at least one pivot post the at least one guide pin being offset from the at least one pivot lost with respect to a vertical axis of the seat assembly.

27. The stroller according to claim 26, wherein the offset is about twenty degrees.

28. The stroller according to claim 26, wherein the at least one guide post allows the seat assembly to pivot with respect to the frame assembly in a forward direction by an angle of about twenty-five degrees with respect to a horizontal axis of the seat assembly, and wherein the at least one guide post allows the seat assembly to pivot with respect to the frame assembly in a rearward direction by an angle of about sixty-five degrees with respect to the horizontal axis of the seat assembly.

29. The stroller according to claim 20, wherein the pivot post of the seat assembly is located at approximately a center of mass of an occupant when seated in the stroller.

30. The stroller according to claim 29, wherein the seat assembly includes a seat base and an outer back rest shell pivotally connected to the seat base, and wherein the pivot post is located in a range of about 4 to 8 inches from the seat base and about 3 to 6 inches from the outer back rest shell.

31. The stroller according to claim 29, wherein the seat assembly includes a seat base, a back rest pivotally mounted to the seat base, and an adjustment mechanism for adjusting an angle between the back rest and the seat base, wherein the back rest pivots about an anatomically correct pivot point of an occupant when seated in the stroller.

32. The stroller according to claim 29, further comprising a foot rest assembly including a foot rest tube connected to the seat assembly, a knee angle block connected to the foot rest tube portion, a foot bed tube pivotally connected to the knee angle block, and a foot bed connected to the foot bed tube, wherein the foot bed pivots about an anatomically correct pivot point of an occupant when seated in the stroller.

* * * * *